United States Patent [19]

Jermyn

[11] Patent Number: 6,026,370
[45] Date of Patent: Feb. 15, 2000

[54] METHOD AND APPARATUS FOR GENERATING PURCHASE INCENTIVE MAILING BASED ON PRIOR PURCHASE HISTORY

[75] Inventor: Michael G. Jermyn, New York, N.Y.

[73] Assignee: Catalina Marketing International, Inc., St. Petersburg, Fla.

[21] Appl. No.: 08/920,355

[22] Filed: Aug. 28, 1997

[51] Int. Cl.[7] .................................................. G06F 17/60
[52] U.S. Cl. ............................... 705/14; 705/10; 705/21; 235/375
[58] Field of Search ............................... 705/14, 10, 17, 705/21, 1; 235/375, 383

[56] References Cited

U.S. PATENT DOCUMENTS

| | | | |
|---|---|---|---|
| 5,515,270 | 5/1996 | Weinblatt | 705/14 |
| 5,612,527 | 3/1997 | Ovadia | 235/383 |
| 5,621,812 | 4/1997 | Deaton et al. | 382/100 |
| 5,687,322 | 11/1997 | Deaton et al. | 705/14 |
| 5,774,868 | 6/1998 | Cragun et al. | 705/10 |
| 5,822,735 | 10/1998 | De Lapa et al. | 705/14 |
| 5,832,457 | 11/1998 | O'Brien et al. | 705/14 |

OTHER PUBLICATIONS

Gellene, Denise; "Loyalty: Check It Out Supermarkets Track Top Patrons, Reward Them With Custom Deals"; LA Times, Jul. 8, 1994.

Eisman, Regina ; "Get Smart"; Incentive, v. 16, N. 9; pp. 83–90, Sep. 1994.

*Primary Examiner*—Melanie A. Kemper
*Assistant Examiner*—Demetra R. Smith
*Attorney, Agent, or Firm*—Oblon, Spivak, McClelland, Maier & Neustadt, P.C.

[57] ABSTRACT

A technique for customizing mailed purchase incentives for selected consumer households, based on a detailed purchasing history of the consumers. Purchase transactions of many consumers, generally in different stores, are accumulated in a purchase history database over a long period of time and then used to generate customized incentive offers for selected consumers. For a selected product category, usually related to a promotional theme, the purchase history database is scanned to select consumers who have made purchases in the same product area as the selected product category. Then each selected consumer's purchase transactions are analyzed to determine a profile for the consumer, such as loyal to the promoted brand, loyal to a competitive brand, or new to the selected product category, although a purchaser of related products. The consumer profile is then used to customize a purchase incentive package generated for each consumer household. The package also includes other printed materials to enhance the purchase incentives. Post-processing provides results reports of response and redemption rates, and retention analysis is used to track the targeted consumers' shopping behavior to assess the long-term effects of a promotion.

21 Claims, 4 Drawing Sheets

METHOD AND APPARATUS FOR GENERATING PURCHASE INCENTIVE MAILING BASED ON PRIOR PURCHASE HISTORY

BACKGROUND OF THE INVENTION

This invention relates generally to point-of-sale computer systems of the type used in retail stores to record sales transactions. More particularly, the invention relates to point-of-sale systems capable of recording the purchasing activities of consumers, household by household. Discount coupons have long been used in the packaged goods industry to promote the sale of specific items to consumers. Many discount coupons are distributed by mail, or as inserts (known as free standing inserts) in newspapers and magazines. This method of distribution has the major drawback that it is not "targeted" to consumers most likely to use the discount coupons. Consequently, mass distribution of discount coupons is not only wasteful in terms of paper and other costs, but results in a very low rate of redemption of the coupons. Most consumers simply ignore them or, if they use coupons at all, discard them because of lack of interest in the specifically promoted products.

A revolutionary change in techniques of discount coupon distribution began with the system described in U.S. Pat. No. 4,723,212 issued to Thomas L. Mindrum et al., entitled "Method and Apparatus for Dispensing Discount Coupons." In this system, coupons were generated and distributed in the retail store, based on the products purchased by the consumers. If a consumer purchased a "triggering" product that had been previously selected as part of a promotion, the consumer would receive a discount coupon upon paying for purchased items at a checkout stand. The coupon handed to the consumer typically provides for a discount on a competitive or complementary product when the customer returns to the store on a subsequent visit. Thus, in the system described in the Mindrum et al. patent, discount coupons generated in the store were distributed only to consumers who had been "targeted" because of their purchase of competitive or related products. U.S. Pat. No. 4,910,672 issued to George W. Off et al., having the same title, disclosed additional features of the system described in the Mindrum et al. patent. A known extension of the technology disclosed in these patents is to generate in-store coupons based on the prior shopping behavior of individual customers. The purchase transactions of consumers, who are identified by identification cards or other means, are recorded and discount coupons are generated in the store on a later store visit, using the purchasing history recorded in prior visits.

Although this extension of the system described in the Mindrum et al. and Off et al. patents successfully targets many consumers with greater success than if prior shopping history were not used, not all consumers receiving coupons in the store remember to bring back for redemption, and some have no routine practice of saving them for the next store visit. In some respects, the old approach of mailing promotional materials is still the best way to reach consumers, but mass mailings have in the past have not been targeted on the right consumers, so have been highly inefficient and wasteful. Accordingly, there is still a need for improvement in targeted techniques for distribution of coupons and other incentives. The present invention fulfills this need, as will become apparent from the following summary.

SUMMARY OF THE INVENTION

The present invention resides in a targeted incentive generation apparatus, and related method, for use with a sales transaction recording system having at least one checkout terminal and a store controller with access to an item price file. Briefly, and in general terms, the apparatus of the invention comprises means for identifying purchased items presented at a checkout terminal; means for identifying consumers presenting items for purchase; data storage means at each store, for holding a temporary record of items purchased by each identifiable consumer; a host computer capable of receiving records of items purchased from the data storage means in multiple stores; and a cumulative purchase transaction database associated with the host computer, for holding a record of purchase transactions accumulated over a relatively long period of time. The host computer includes processing means for scanning the cumulative database to select consumer households that have purchased products falling within defined product categories, means for profiling each selected consumer household in terms of brand loyalty with respect to a promoted brand, means for generating incentives that differ based on the consumer household profile, and means for printing the incentives for mailing to the selected consumer households. More specifically, the processing means within the host computer further includes means for merging with the generated incentives other textual and pictorial material that further enhances the customized purchase incentives.

The processing means within the host computer may also include means for generating response and redemption statistics for each consumer profile category used in the incentive mailing, and means for generating retention statistics indicative of how consumers who receive the customized purchase incentives continue to shop with respect to the promoted brand. The response and redemption statistics provide a tool for evaluating the direct or short-term effects of the purchase incentives, and the retention statistics provide a tool for evalutating the long-term effects of the incentives.

The invention may also be defined in terms of a method for generation of purchase incentives, for use with a sales transaction recording system having at least one checkout terminal and a store controller with access to an item price file. The method comprises the steps of: (a) identifying items purchased at a checkout terminal; (b) identifying consumers presenting items for purchase; (c) recording sales transactions in association with the consumers who made them, in a global consumer purchase database; (d) selecting a product category for promotion; (e) scanning the global consumer purchase database to select consumers who have purchased items in the promoted product category or in a broader product designation; (f) determining each selected consumer's profile based on loyalty to a promoted brand within the selected product category; (g) customizing at least one purchase incentive for each selected consumer, based on the determined profile for each consumer; and (h) distributing the customized purchase incentives to the selected consumers, to provide targeting of incentives to a consumer household level. The method may also include merging the customized incentives for each selected consumer with appropriate additional material describing the product promotion. More specifically, the step (f) of determining each selected consumer's profile includes determining whether the consumer's prior purchases have been of promoted brands, competitive brands or products only related to the promoted product category; and designating the consumer as either "brand loyal," a "competitive user," or "new to the product category," respectively. Further, the step of customizing the purchase incentive includes either providing a modest discount coupon to ensure continued brand loyalty, providing a greater discount coupon to encourage brand switching, or providing free sample information, to encourage the consumer to call for a fee sample of a promoted product, respectively.

In one variant of the method the steps (e) (scanning the global consumer purchase database), (f) (customizing at least one purchase incentive), and (g) (customizing at least one purchase incentive for each selected consumer) are repeated for different product categories, to perform different customization of the incentives for different product categories.

The method of the invention may also include scanning the global consumer purchase database to select consumers based on one or more demographic factors selected with a view to maximizing response and redemption rates for the incentives distributed in the distributing step (h). For better evaluation of the effects of the incentive distribution, the method may also include the step of generating response and redemption statistics after allowing sufficient time for response to or redemption of the incentives. Long-term effects of the incentives may also be evaluated by generating, at selected times after the distributing step, retention statistics indicative of the continued shopping behavior of customers who received the incentives.

It will be appreciated from the foregoing that the present invention represents a significant advance in the field of automatic generation of purchasing incentives in a retail store environment. In particular, the invention provides for automatic adjustment of a purchasing incentive based on the price paid for an item purchased and on whether a promoted item or a competitive item is purchased. Other aspects and advantages of the invention will become apparent from the following more detailed description, taken in conjunction with the drawings.

DESCRIPTION OF THE PROFFERED EMBODIMENT

As shown in the drawings for purposes of illustration, the present invention pertains to a novel technique for generation and distribution of purchase incentives, such as discount coupons, based on a variety of factors used to "target" consumers who will benefit most from the incentives, and who are, therefore, more likely to redeem distributed discount coupons on a subsequent store visit. Prior to the present invention, systems for discount coupon generation has been by mass mailings, or in stores to selected consumers to receive coupons based solely on whether or not the consumers had purchased a "triggering" product associated with each coupon deal, or based on the consumer's prior shopping history.

In accordance with the present invention, the advantages of in-store gathering of purchase history are combined with the advantages of distribution of incentives by mail, to provide an incentive distribution technique that successfully targets consumers based on their prior shopping history, and places appropriate purchasing incentives in their hands in a package that encourages retention and use of the incentives.

Figure 1:
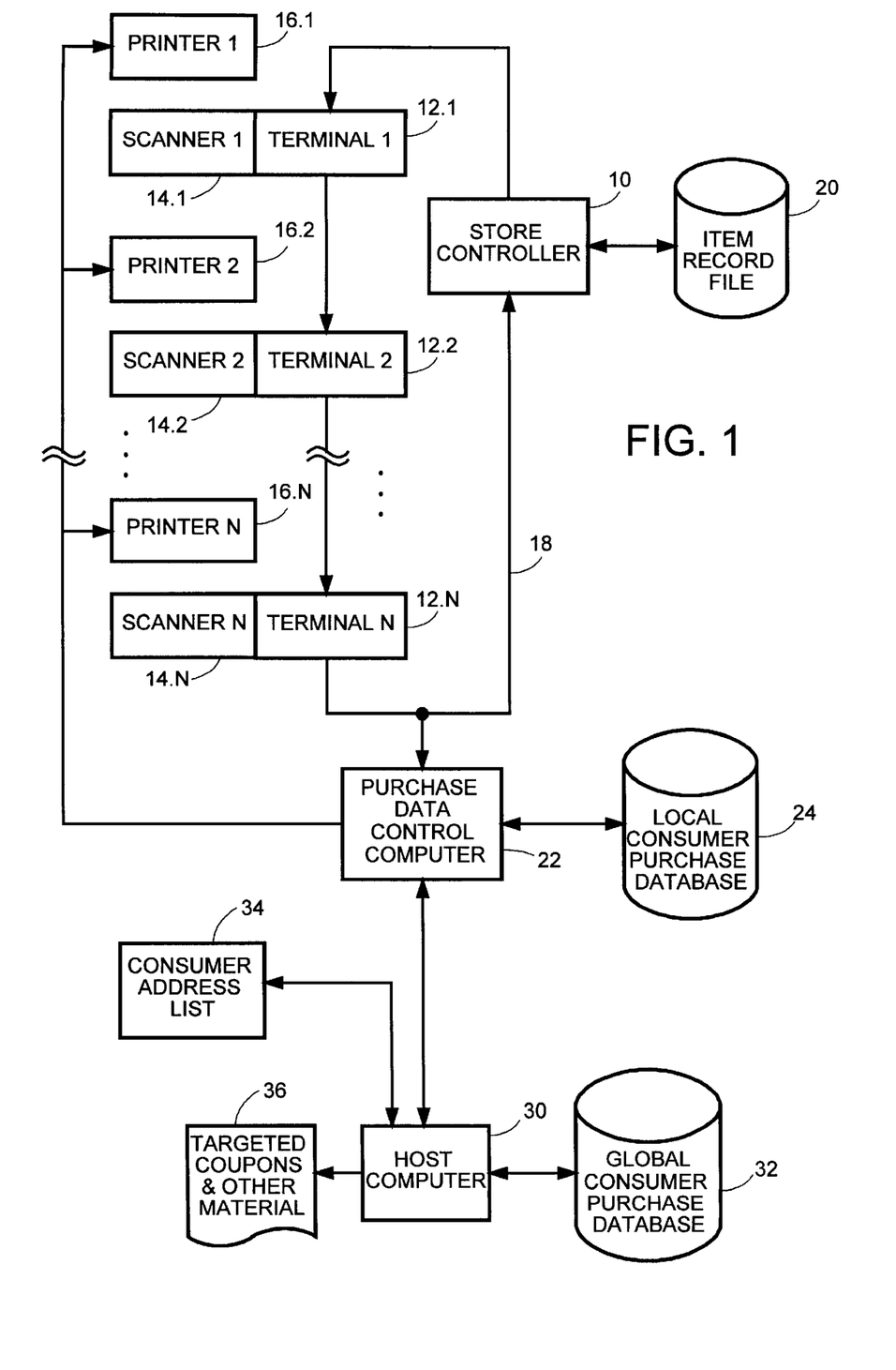
FIG. 1 is a block diagram of an in-store computer system in which the present invention is implemented.

The system of the invention is implemented in a retail store or, more commonly, in multiple retail stores, as shown generally in FIG. 1. Each store in which the invention is implemented has a store controller, indicated by reference numeral 10, and a plurality of checkout terminals 12.1, 12.2, through 12.N, referred to for convenience by reference numeral 12. The terminals 12 have optical scanners 14.1, 14.2 through 14.N and printers 16.1, 16.2 through 16.N, referred to by numerals 14 and 16. As will shortly become apparent, the printers 16 used for distribution of in-store purchase incentives, are not needed in the present invention. The terminals 12 are typically connected to the store controller 10 by a continuous data and control bus 18 referred to as the store loop. The store controller 10 has access to various databases, including an item record file 20, which contains a record of each item in the store's inventory. Each item record includes the item price, and other data specific to the item. As is now well known, when a customer presents products or items for purchase at a checkout stand, a sales clerk scans each item for a bar code printed on the item packaging. The bar code defines the product uniquely. In the retail grocery business in the United States of America, product bar codes are standardized as Uniform Product Codes. In other retail businesses, different standards may be used to identify items, and in other countries the product bar codes may follow different standards.

The store equipment also includes another computer, referred to in this specification as the purchase data control computer 22. The purchase data control computer 22 is shown as being a separate processor connected to the store loop 18 to "eavesdrop" on sales transaction data and control signals transmitted from any of the terminals 12 to the store controller 10. It will, of course, be understood that the functions of the purchase data control computer 22 could be integrated with those of the store controller 10. For convenience of design and maintenance, however, it is usually desirable to separate the traditional store controller functions from those relating to generation of incentives for consumers.

In this specification, the words "coupon" and "incentive" are sometimes used interchangeably, but it will be understood that an incentive may take the form of the familiar discount coupon printed on paper, or may take some other form. An incentive may be provided to the consumer on some medium other than paper, such as a membership card having a recording medium, or the incentive may take an even less tangible form, such as a digital record transferred to the consumer's account at the store or at a banking institution. The "incentive" may be a discount applied to a subsequent purchase, a free trial offer for a specific product, or a cash discount to be applied on a subsequent store visit. As presently implemented, the incentive will be conveyed to the consumer as a piece of paper, which is sometimes referred to herein as a "coupon," but use of the word "coupon" is not intended to be limited to a paper discount coupon.

The purchase data control computer 22 has access to a number of related databases, the most important of which is a local consumer purchase database 24, which is used to hold, in the retail store, a record of purchase transactions gathered over a period of time. There are various ways to link operation of the purchase data control computer 22 with the sales transaction process controlled by the store controller 10. In a presently preferred embodiment of the invention, and as disclosed in U.S. Pat. No. 4,723,212, each item record in the item record file 20 has "trigger" flag field, which identifies the item as being subject to monitoring in terms of its purchase transaction. The trigger flag may, therefore, be employed to limit the selection of items that are subject to recording in the local consumer purchase database 24. Alternatively, the trigger flag may be simply ignored, in which case all purchased items are subject to transaction recording in the local consumer purchase database. In the presently preferred embodiment of the invention approximately 80% of all store product categories are monitored in purchase transactions by identifiable consumers.

The purchase data control computer 22 in each store is linked to a remotely located host computer 30, which maintains a central database referred to as the global consumer purchase database 32. On a periodic basis, such as daily, the contents of the local consumer purchase database 24 in each store are uploaded to the host computer and consolidated with the global consumer purchase database 32. Thus the global consumer purchase database 32 contains a complete purchase history for each identifiable consumer for some relatively long period of time, such as a year. Larger storage devices, of course, allow longer purchase history periods to be maintained, but for the present a one year period appears to be an appropriate maximum. The host computer 30 also has access to a consumer address list 34, which is ideally a consolidation of address lists obtained from multiple cooperating retailer chains. This global address list not only permits the invention to be applied to the customers of multiple retailers, but also allows the consolidation of shopping histories of individual consumers who happen to shop at different store chains. As will be discussed in more detail below, in accordance with the invention the host computer 22 uses the global consumer purchase database 32 and the consumer address list 34 to generate targeted coupons and other materials, as indicated in block 34, for distribution to the selected consumers by mail or other means. The host computer 30 may also be provided with additional consumer data supplied from external sources (not shown). The additional consumer data may include address information or demographic data not obtainable from the retailer address lists. For example, a consumer who pays by check or credit card may be uniquely identifiable for purposes of recording a purchase history, but the consumer's address and other personal data may have to be obtained from sources other than the retailer's customer list, because the consumer is not included in such a list.

Figure 2:
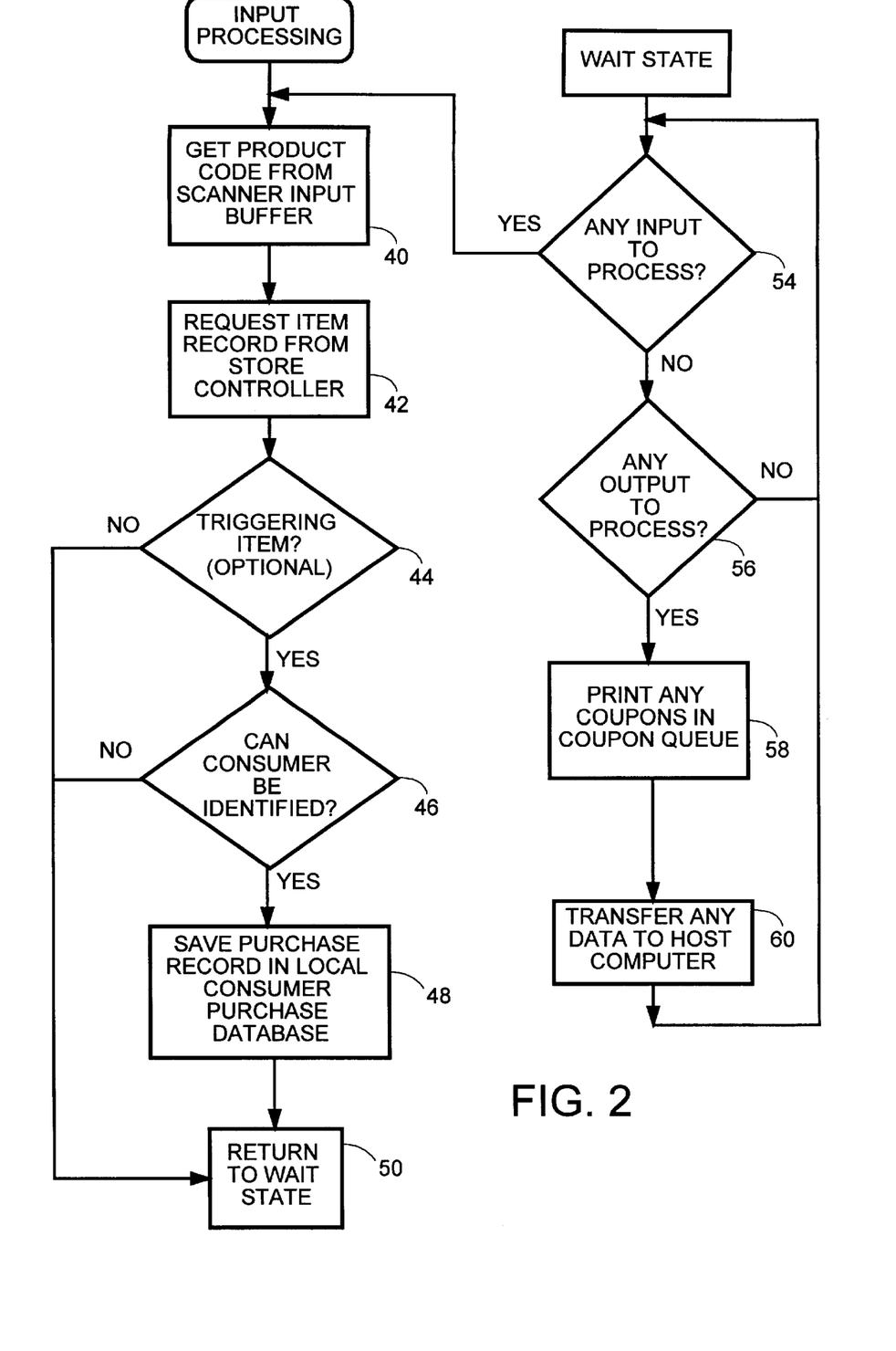
FIG. 2 is a flowchart showing some of the pertinent functions performed by an incentive control computer in FIG. 1.

FIG. 2 shows in flowchart form the most significant steps, from the standpoint of the present invention, performed by the computer 22. It will be appreciated that the computer 22 also performs other, routine housekeeping functions, but how these are implemented is not critical to the present invention.

In input processing, the computer 22 first obtains a product code from a scanner 14 associated with one of the terminals 12, as indicated in block 40. Using the input product code, the computer 22 requests the corresponding item record from the store controller 10, as indicated in block 42. If the item record indicates that this is a triggering item, as determined in decision block 44, the computer 22 continues processing this item, but otherwise returns to a "wait state" of the computer. As previously mentioned, however, the item record files can be configured such that the triggering flag is ignored and all of the scanned items are then effectively "triggering items." The next processing step, indicated in decision block 46, is to determine whether the consumer purchasing the item can be identified. At the time of scanning the item, the answer to this question may not be possible to ascertain, since consumer identification is usually presented at the end of the transaction. It will be understood, therefore, that the flowchart has been simplified in this regard for purposes of explanation. In practice, all items in the transaction will be recorded temporarily until consumer identification is performed. Then, if the consumer is identifiable, the purchase transaction will be permanently recorded in the local consumer purchase database 24, as indicated in block 48, and the computer 22 will revert to its wait state, as indicated by block 50. The consumer may be identified as a member of a retailer frequent shopper program, or simply from a unique credit card number of checking account number.

The wait state of the computer 22 is a small processing loop through which the computer cycles while determining which function to perform next, such as processing input data or output data. The right-hand side of FIG. 2 shows part of the wait state processing loop of the computer 22. Basically, in the wait state the computer 22 continually poses the questions: is there any input data to process, as shown in decision block 54, and is there any output data to process, as shown in decision block 56. If there is input data to process, the computer 22 goes to the input processing sequence, starting with block 40. If there is any output to process, the computer 22 prints any in-store coupons in the coupon queue, as indicated in block 58 and continues to cycle through the wait state. Another output processing function in the context of the present invention is to transfer or upload data to the host computer 30. Thus, as indicated in block 60, the computer 22 periodically checks to determine if there are any data blocks to transfer to the host computer 30. Mechanisms for performing this transfer are well known. For example, the transfer may be initiated as a result of a clock interrupt in the computer 22 or the host computer 30, or may be initiated when the local consumer purchase database 24 is filled to a selected level.

Figure 3:
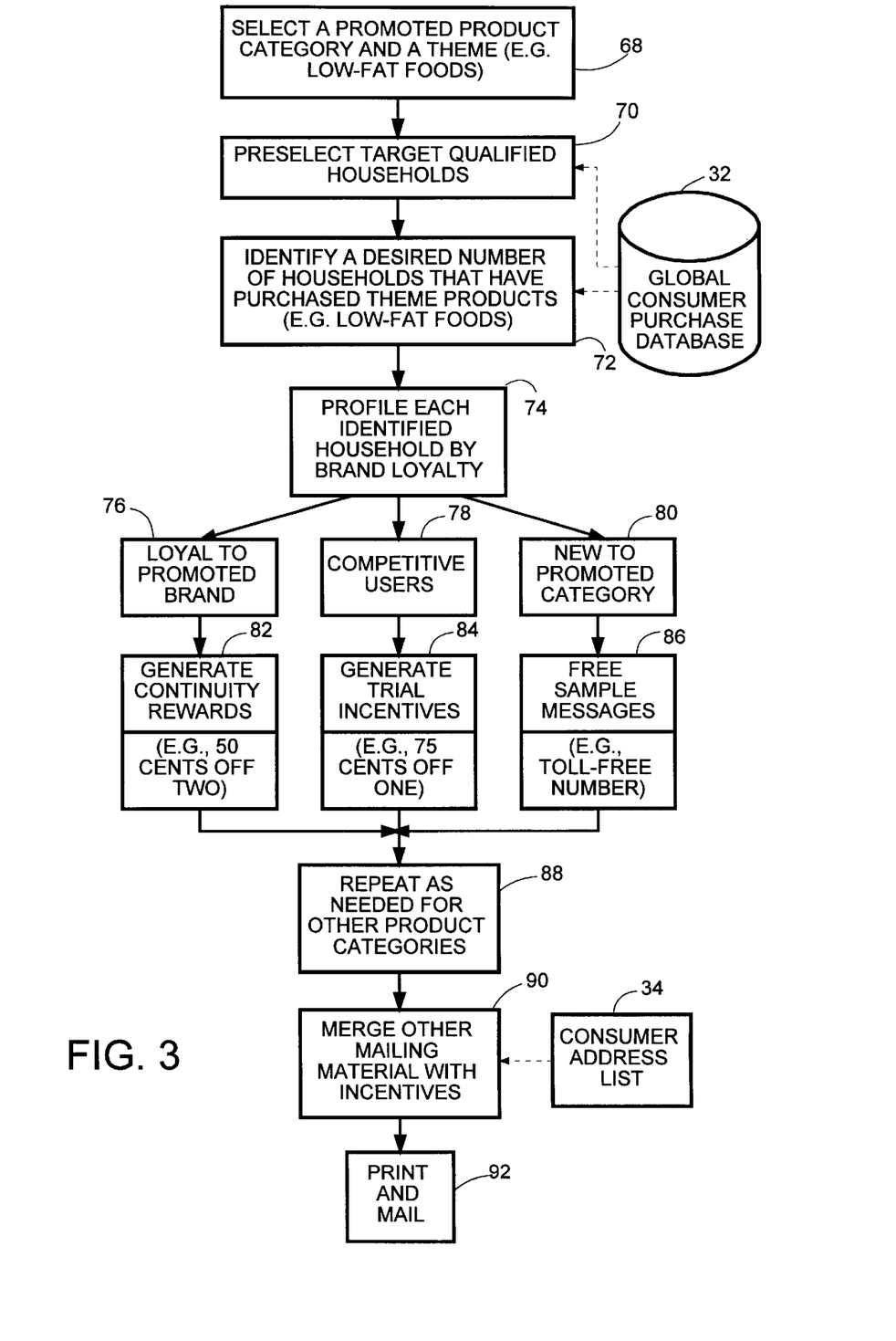
FIG. 3 is a flowchart showing the pertinent functions performed in accordance with the invention by the host computer shown in FIG. 1.

FIG. 3 is a flowchart showing the principal functions performed by the host computer 30 in accordance with the present invention. These functions are performed "off-line" and typically not in any store in which the consumer purchase transaction take place. Although the host computer may be located at a retail chain administrative site, as presently contemplated the invention would be best suited to serve multiple retailer chains and the host computer would, therefore, be located at an operations site of an independent organization serving multiple retailers and manufacturers. One object of the invention in its presently preferred form is to generate purchase incentives in an attractive magazine format that features a single "theme" pertaining to various product categories. For example, the theme may be "healthy diet selections" or "low-fat foods." The first step shown in FIG. 3 is, therefore, normally performed by administrative personnel and not by the computer 22 itself. As described in block 68, a selection is made of at least one promoted product category and a promotion theme. The product category may include, for example, a wide variety of low-fat foods that would fit in with the overall theme of "healthy diet selections." Then, as indicated in block 70, the global consumer database 32 is initially scanned to preselect target qualified consumer households that will be suitable for the promotion. This initial filtering of the consumer database may be made on the basis of any appropriate condition. For many promotion themes, only consumer households of three or more persons may be selected. For others, qualification on the basis of age will be appropriate, and for still others there may be other demographic factors that are more appropriate. Data in the global consumer purchase database will, in general, have to be supplemented from outside databases if the needed qualifying factors are not contained in customer loyalty card or check-cashing card applications.

In the next step, indicated in block 72, the global consumer purchase database 32 is again scanned to identify a desired number of the preselected consumer households that have purchased products that fit with the current theme identified in block 70. The desired number of consumer households so identified will usually be limited to keep the promotion within a given budget. Since the global database 32 may be national in scope, the desired number may be limited by any of a number of factors, such as geographical region, or dates of the purchases in the historical database. Because the purchase database 32 also may also be used to store such related data as total transaction amounts, the search may also be limited using these additional factors or, if available, demographic data drawn from the consumer address lists 34 or elsewhere.

The next step in the process is to profile each selected household by brand loyalty, as indicated in block 74. The selected promotional theme typically promotes a selected brand or brands within the selected product category or categories. The consumers' purchase records, on the other hand, are selected because they indicate more than a threshold of interest in buying certain types of products, such as low-fat food products. In this step, each consumer household is categorized or profiled in terms of its apparent loyalty to promoted brands of products. Three profile categories are indicated in FIG. 3: consumers who are loyal to the promoted brand or brands (as shown in block 76), consumers who are loyal to competitive brands (as shown in block 78), and consumers who are new to the promoted product category (as shown in block 80). The latter profile category applies, for example, to consumers who have bought low-fat foods, but not those falling within a more specific product category that is part of the promotion. For example, the promotion may deal only with frozen foods, but the consumer has purchased many other low-fat items, such as dairy products or beverages.

In accordance with the invention, each category of consumer household is targeted with a different level of purchase incentive. As indicated in block 82, the loyal purchaser of a promoted brand is rewarded with a "continuity reward," such as a discount coupon, but with a lower discount than a consumer of a competitive product, as indicated in block 84. A consumer new to the promoted category of products, may be invited to receive a free sample, as indicated in block 86, by calling a toll-free telephone number provided on a printed coupon.

As indicated in block 88, the profiling and incentive selection process may, if necessary, be repeated for other product categories falling within the selected promotion theme. Again, if "healthy diet selections" is the theme, multiple product categories may be selected to fall within the theme, such as "frozen dinners," "dairy products," "dietary supplements," and so forth. Each of the product categories will, in general, result in different sets of identified consumer households. Moreover, a household that falls, for example, into the "brand loyal" profile for frozen dinners may be a "competitive user" for dairy products. Because the incentives are effectively customized by household, each consumer will receive an incentive package that takes all these differences into account.

In the final step before printing and mailing of the incentive packages (block 92), other mailing materials are merged with the incentives, as indicated in block 90. Ideally, these include descriptive text, photographic and other materials, combined into an attractive magazine format that highlights the theme and presents the printed purchase incentives. Typically, the incentive packages are designed for seasonable presentation, such as for summer food selections, holiday food selections, back-to-school supplies, and so forth.

Figure 4:
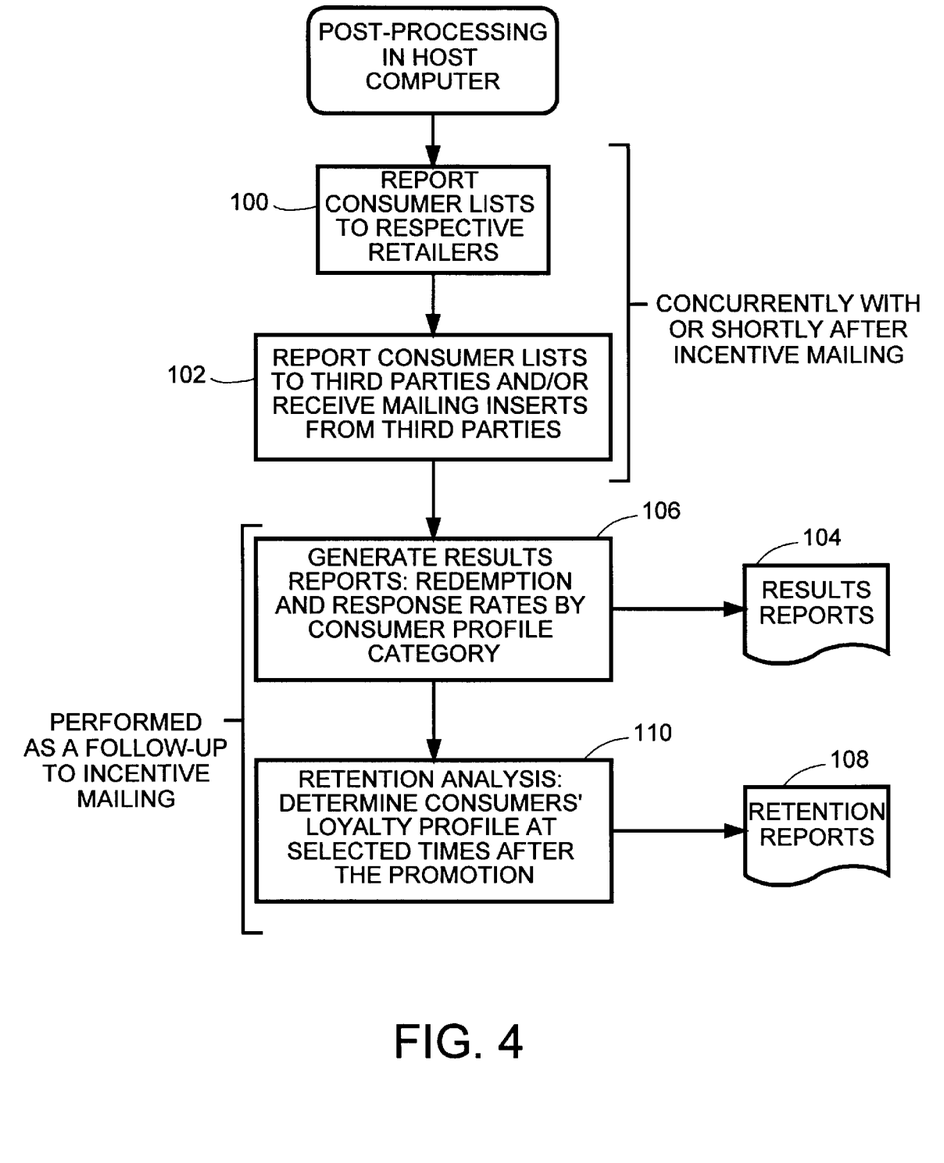
FIG. 4 is a flowchart showing post-processing steps that are performed in the host computer of FIG. 1, including steps to evaluate the effects of a distribution of purchase incentives.

As shown in FIG. 4, the host computer 30 also performs a number of important post-processing functions in accordance with other aspects of the invention. First, at about the time of mailing the incentive packages, and as shown in block 100, the host computer 30 reports the selected consumer lists to respective retailers. In general, a promotional mailing will be directed to customers of multiple retail chains. The retail chains are identifiable from the purchase transaction data in the global consumer database 32 and the consumer mailing list can be easily sorted by retailer and store. The retailer then has the benefit of this information to provide follow-up mailing or supplemental promotions to take advantage of the initial mailing.

Another activity that may be performed at or about the time of incentive package mailing is, as shown in block 102, communication with third parties with an interest in the mailing lists generated for the incentive mailing. A third party, such as a large brand-name manufacturer, may have an interest in a certain demographically defined segment of consumers. Either the appropriate list may be transferred to the third party, or third-party materials may be received for inclusion in the package mailing.

In accordance with another aspect of the invention, the host computer 30 also generates results reports 104, as indicated in block 106, and retention reports 108, as indicated in block 110. Results reports are based on the redemption and response rates associated with the mailed incentives, for each category of consumer profile. These reports reflect average rates, without regard to individual redemption and response behavior. These types of reports cannot be generated until after the expiration date of discount coupons or other types of incentive that are distributed. Their purpose, of course, is to help the manufacturer determine the effectiveness of the promotion, in its various aspects. Retention reports focus more on individual consumers after the promotional event, and help determine whether consumers have been converted to a new brand, retained as a brand-loyal consumer, or have not been affected by promotion.

It will be appreciated from the foregoing that the present invention represents a significant advance in the field of automatic generation of targeted purchase incentives. In particular, the invention combines the proven advantages of mailed incentive packages with the consumer targeting advantages of a complete record of consumer purchases over a long period of time. Thus each purchasing incentive is customized for consumer household that receives it, based on prior purchases of either the same brand, a competitive brand, or related items in a different product category. It will also be appreciated that, although a specific embodiment of the invention has been described in detail for purposes of illustration, various modifications may be made without departing from the spirit and scope of the present invention. Accordingly, the invention should not be limited except as by the appended claims.

I claim:

1. A system for marketing to customers, said system comprising:

(1) a purchase data database for storing in association with one another (a) data indicating a first customer identification and (b) data identifying a first purchased product and a brand of said first purchased product, said association indicating that said first customer identification was received as part of a purchase of said first purchased product;

(2) means for categorizing products into a product category set of defined product categories;

(3) means for selecting a product category subset that contains at least two and less than all of the product categories of said product category set;

(4) means for determining a customer identification subset that contains customer identifications stored in said purchase database that are associated with data indicating purchase of any product contained in said product category subset;

(5) means for determining, for each customer identification contained in said customer identification subset, if that customer identification is stored in association (a) with data indicating that a product purchased in a first selected product category of said product category subset is of said first brand, (b) with data indicating that a product purchased in said first selected product category is not of said first brand, or (c) with no data indicating a product purchased in said first selected product category, thereby making for each customer identification contained in said customer identification subset a first determination; and (6) means for generating, for each customer identification contained in said customer identification subset, promotion data depending upon said first determination for that customer identification.

2. A system according to claim 1 wherein said purchase data comprises purchase time data indicating when a purchased product was purchased.

3. A system according to claim 1 wherein said purchase data comprises data indicating purchase price.

4. A system according to claim 1, further comprising:

second means for determining, for each customer identification contained in said customer identification subset, if that customer identification is stored in association (a) with data indicating a product purchased in a second selected product category of said product category subset is of said first brand, (b) with data indicating a product purchased in said second selected product category is not of said first brand, or (c) with no data indicating a product purchased in said second selected product category, thereby making for each customer identification contained in said customer identification subset a second determination; and wherein said means for generating promotion data comprises means for generating, for each customer identification contained in said customer identification subset, promotion data depending upon said second determination for that customer identification.

5. A system according to claim 1 further comprising:

means for determining a desired number of customers for receiving a promotion; and means for limiting a number of customer identifications associated with products purchased that meet said specified purchase criteria to not more than said desired number.

6. A system according to claim 1 further comprising means for transmitting data indicating the promotion to said address.

7. A system according to claim 1 further comprising means for printing and addressing promotions based upon the promotion data.

8. A system according to claim 1 further comprising means for associating with one another purchase data for purchases from different stores and associated with a common address.

9. A system according to claim 1 further comprising means for generating response and retention statistics associated with a customer identification for promotions based upon promotion data generated for that customer identification.

10. The system according to claim 1 further comprising means for generating retention statistics associated with a customer identification for which promotion data was generated.

11. A method for marketing to customers, said method comprising the steps of:

(1) storing in a purchase data database in association with one another (a) data indicating a first customer identification and (b) data identifying a first purchased product and a brand of said first purchased product, said association indicating that said first customer identification was received as part of a purchase of said first purchased product;

(2) categorizing products into a product category set of defined product categories;

(3) selecting a product category subset that contains at least two and less than all of the product categories of said product category set;

(4) determining a customer identification subset that contains customer identifications stored in said purchase database that are associated with data indicating purchase of any product contained in said product category subset;

(5) determining, for each customer identification contained in said customer identification subset, if that customer identification is stored in association (a) with data indicating that a product purchased in a first selected product category of said product category subset is of said first brand, (b) with data indicating that a product purchased in said first selected product category is not of said first brand, or (c) with no data indicating a product purchased in said first selected product category, thereby making for each customer identification contained in said customer identification subset a first determination; and (6) generating, for each customer identification contained in said customer identification subset, promotion data depending upon said first determination for that customer identification.

12. A method according to claim 11 wherein said purchase data comprises purchase time data indicating when a purchased product was purchased.

13. A method according to claim 11 wherein said purchase data comprises data indicating purchase price.

14. A method according to claim 11, further comprising the step of:

determining, for each customer identification contained in said customer identification subset, if that customer identification is stored in association (a) with data indicating a product purchased in a second selected product category of said product category subset is of said first brand, (b) with data indicating a product purchased in said second selected product category is not of said first brand, or (c) with no data indicating a product purchased in said second selected product category, thereby making for each customer identification contained in said customer identification subset a second determination; and wherein said step of generating promotion data comprises generating, for each customer identification contained in said customer identification subset, promotion data depending upon said second determination for that customer identification.

15. A method according to claim 11 further comprising the step of:

determining a desired number of customers for receiving a promotion; and limiting a number of customer identifications associated with products purchased that meet said specified purchase criteria to not more than said desired number.

16. A method according to claim 11 further comprising the step of transmitting data indicating the promotion to said address.

17. A method according to claim 11 further comprising the step of printing and addressing promotions based upon the promotion data.

18. A method according to claim 11 further comprising the step of associating with one another purchase data for purchases from different stores and associated with a common address.

19. A method according to claim 11 further comprising the step of generating response and retention statistics associated with a customer identification for promotions based upon promotion data generated for that customer identification.

20. The method according to claim 11 further comprising the step of generating retention statistics associated with a customer identification for which promotion data was generated.

21. A computer program product storing code for specially programming a computer for marketing to customers, said computer program product comprising instructions for the computer to performing the following steps:

(1) storing in a purchase data database in association with one another (a) data indicating a first customer identification and (b) data identifying a first purchased product and a brand of said first purchased product, said association indicating that said first customer identification was received as part of a purchase of said first purchased product;

(2) categorizing products into a product category set of defined product categories;

(3) selecting a product category subset that contains at least two and less than all of the product categories of said product category set;

(4) determining a customer identification subset that contains customer identifications stored in said purchase database that are associated with data indicating purchase of any product contained in said product category subset;

(5) determining, for each customer identification contained in said customer identification subset, if that customer identification is stored in association (a) with data indicating that a product purchased in a first selected product category of said product category subset is of said first brand, (b) with data indicating that a product purchased in said first selected product category is not of said first brand, or (c) with no data indicating a product purchased in said first selected product category, thereby making for each customer identification contained in said customer identification subset a first determination; and (6) generating, for each customer identification contained in said customer identification subset, promotion data depending upon said first determination for that customer identification.

\* \* \* \* \*

UNITED STATES PATENT AND TRADEMARK OFFICE
CERTIFICATE OF CORRECTION

PATENT NO.    : 6,026,370
DATED         : February 15, 2000
INVENTOR(S)   : Michael G. Jermyn It is certified that error appears in the above-identified patent and that said Letters Patent is hereby corrected as shown below:

Column 9,
Line 2, change "a brand" to -- a first brand --;
Line 59, delete "said"
Line 63, change "said" to -- an --.

Column 10,
Line 10, change "The system" to -- A system --;
Line 19, change "a brand" to -- a first brand --.

Column 11,
Line 11, delete "said";
Line 14, change "said" to -- an --
Line 28, change "The method" to -- A method --;
Line 35, change "performing" to -- perform --.

Column 12,
Line 4, change "a brand" to -- a first brand --.

Signed and Sealed this

Second Day of October, 2001

Attest:

NICHOLAS P. GODICI
Attesting Officer    Acting Director of the United States Patent and Trademark Office